US010382488B1

(12) United States Patent
Gu et al.

(10) Patent No.: US 10,382,488 B1
(45) Date of Patent: Aug. 13, 2019

(54) SYSTEMS AND METHODS FOR ENFORCING ACCESS-CONTROL POLICIES

(71) Applicant: Symantec Corporation, Mountain View, CA (US)

(72) Inventors: Lei Gu, Bedford, MA (US); Keith Newstadt, West Newton, MA (US)

(73) Assignee: Symantec Corporation, Mountain View, CA (US)

( * ) Notice: Subject to any disclaimer, the term of this patent is extended or adjusted under 35 U.S.C. 154(b) by 236 days.

(21) Appl. No.: 15/237,087

(22) Filed: Aug. 15, 2016

(51) Int. Cl.
*H04L 29/06* (2006.01)

(52) U.S. Cl.
CPC ............ *H04L 63/20* (2013.01); *H04L 63/102* (2013.01); *H04L 65/4084* (2013.01); *H04L 2463/101* (2013.01)

(58) Field of Classification Search
CPC .......................... H04L 63/102; H04L 65/4084
See application file for complete search history.

(56) References Cited

U.S. PATENT DOCUMENTS

| 2008/0066125 | A1* | 3/2008 | Li | ........................ | H04N 7/165 |
| | | | | | 725/97 |
| 2008/0226119 | A1* | 9/2008 | Candelore | ......... | G06F 17/30256 |
| | | | | | 382/100 |
| 2011/0047388 | A1* | 2/2011 | Park | .................... | G06F 21/6209 |
| | | | | | 713/189 |
| 2014/0168071 | A1* | 6/2014 | Ahmed | .............. | H04N 5/23206 |
| | | | | | 345/156 |

OTHER PUBLICATIONS

Norton Family; https://family.norton.com/web/; as accessed on Aug. 1, 2016.
Apple TV; http://www.apple.com/tv/; as accessed on Aug. 1, 2016; Jan. 9, 2007.
Chromecast; https://www.google.com/chromecast/; as accessed on Aug. 1, 2016; Jul. 24, 2013.
Amazon Fire Stick; https://www.amazon.com/Amazon-Fire-TV-Stick-Streaming-Media-Player/dp/B00GDQ0RMG; as accessed on Aug. 1, 2016; Nov. 19, 2014.

(Continued)

*Primary Examiner* — Brandon S Hoffman
*Assistant Examiner* — Thong P Truong
(74) *Attorney, Agent, or Firm* — FisherBroyles, LLP

(57) ABSTRACT

A computer-implemented method for enforcing access-control policies may include (i) identifying streaming content that is being transmitted from a media server to a media playback system, (ii) determining that a supervised user is within exposure range of the media playback system and could be exposed to the streaming content, (iii) receiving a sample of the content from a sampling system that is remote from the media playback system, (iv) identifying an access-control policy that defines a content-access restriction for the supervised user, (v) determining, based on an analysis of the sample of the content, that the access-control policy applies to the content, and (vi) in response to determining that the access-control policy applies to the content, enforcing the access-control policy by applying the content-access restriction to the streaming content. Various other methods, systems, and computer-readable media are also disclosed.

20 Claims, 7 Drawing Sheets

(56) References Cited

OTHER PUBLICATIONS

Netflix; https://www.netflix.com/; as accessed on Aug. 1, 2016; Aug. 29, 1997.
YouTube; https://www.youtube.com/; as accessed on Aug. 1, 2016; Feb. 14, 2005.
Amazon Prime; https://www.amazon.com/Amazon-Prime-One-Year-Membership/dp/B00DBYBNEE; as accessed on Aug. 1, 2016; Feb. 2005.
Pandora; http://www.pandora.com/; as accessed on Aug. 1, 2016; 2005.
Spotify; https://www.spotify.com/; as accessed on Aug. 1, 2016; Oct. 2008.
Shazam; http://www.shazam.com/; as accessed on Aug. 1, 2016; 1999.

* cited by examiner

SYSTEMS AND METHODS FOR ENFORCING ACCESS-CONTROL POLICIES

BACKGROUND

Parental control software is typically used to monitor and control the content that a specific user may access. For example, a parent may want to prevent their child from watching adult-rated movies and may set up parental control policies to prevent access to these movies. Traditionally, parental control software may be installed on a device and control the content that is accessed on that particular device. For example, the software may restrict the types of content a child may access on the device using predefined content categories, such as movie ratings.

However, in some cases, it may not be possible to enforce parental controls on particular devices. For example, parental control software may not be able to control streaming devices that can stream content from a separate server. Furthermore, some content may not have clear, predetermined categories than can be controlled using overarching rules. In this case, traditional parental control software may have difficulty determining whether unknown or unrated content should be allowed and may block safe content or allow prohibited content. Therefore, a better method of identifying potentially restricted content is needed for parental control software to accurately prevent access to such content on all devices. Accordingly, the instant disclosure identifies and addresses a need for additional and improved systems and methods for enforcing access-control policies.

SUMMARY

As will be described in greater detail below, the instant disclosure generally relates to systems and methods for enforcing access-control policies by sampling streaming content and controlling a source of access. In one example, a computer-implemented method for enforcing access-control policies may include (i) identifying streaming content that is being transmitted from a media server to a media playback system, (ii) determining that a supervised user is within exposure range of the media playback system and could be exposed to the streaming content, (iii) receiving a sample of the content from a sampling system that is remote from the media playback system, (iv) identifying an access-control policy that defines a content-access restriction for the supervised user, (v) determining, based on an analysis of the sample of the content, that the access-control policy applies to the content, and (vi) in response to determining that the access-control policy applies to the content, enforcing the access-control policy by applying the content-access restriction to the streaming content.

In some embodiments, determining that the supervised user is within the exposure range of the media playback system may include identifying the supervised user by collecting biometric information, receiving identifying information of the supervised user from a networked device, receiving login information of the supervised user from the media playback system, detecting a device that belongs to the supervised user, and/or determining that a location of the supervised user is within the exposure range. In these embodiments, determining that the location of the supervised user is within the exposure range may include using a motion sensor to detect the location of the supervised user and/or determining that a location of the device that belongs to the supervised user is within the exposure range.

In some examples, receiving the sample of the content from the sampling system may include determining the sampling system is within the exposure range of the media playback system by receiving, from the sampling system, information indicating that the sampling system has detected playback of the content. Additionally, receiving the sample may also include instructing the sampling system to sample the content and correlating the received sample with the content.

In one embodiment, determining that the access-control policy applies to the content may include matching the sample of the content to a known content. Additionally or alternatively, determining that the access-control policy applies to the content may include converting the sample of the content to textual data and performing a content analysis on the textual data. In this embodiment, performing the content analysis on the textual data may include text mining the textual data for patterns, categorizing the patterns into at least one content category, and/or determining that the access-control policy applies to the content category.

In one example, enforcing the access-control policy may include preventing transmission of the content from the media server to the media playback system. Additionally or alternatively, enforcing the access-control policy may include alerting an administrator that the supervised user could be exposed to the streaming content.

In one embodiment, a system for implementing the above-described method may include (i) an identification module, stored in memory, that identifies streaming content that is being transmitted from a media server to a media playback system, (ii) a determination module, stored in memory, that determines that a supervised user is within exposure range of the media playback system and could be exposed to the streaming content, (iii) a reception module, stored in memory, that receives a sample of the content from a sampling system that is remote from the media playback system, (iv) a policy module, stored in memory, that identifies an access-control policy that defines a content-access restriction for the supervised user, (v) an analysis module, stored in memory, that determines, based on an analysis of the sample of the content, that the access-control policy applies to the content, and (vi) an enforcement module, stored in memory, that, in response to determining that the access-control policy applies to the content, enforces the access-control policy by applying the content-access restriction to the streaming content. In addition, the system may include at least one processor that executes the identification module, the determination module, the reception module, the policy module, the analysis module, and the enforcement module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify streaming content that is being transmitted from a media server to a media playback system, (ii) determine that a supervised user is within exposure range of the media playback system and could be exposed to the streaming content, (iii) receive a sample of the content from a sampling system that is remote from the media playback system, (iv) identify an access-control policy that defines a content-access restriction for the supervised user, (v) determine, based on an analysis of the sample of the content, that the access-control policy applies to the content, and (vi) in response to determining that the access-control policy applies to the content, enforce the access-control policy by applying the content-access restriction to the streaming content.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of representative embodiments and are a part of the specification. Together with the following description, these drawings demonstrate and explain various principles of the instant disclosure.

Figure 1:
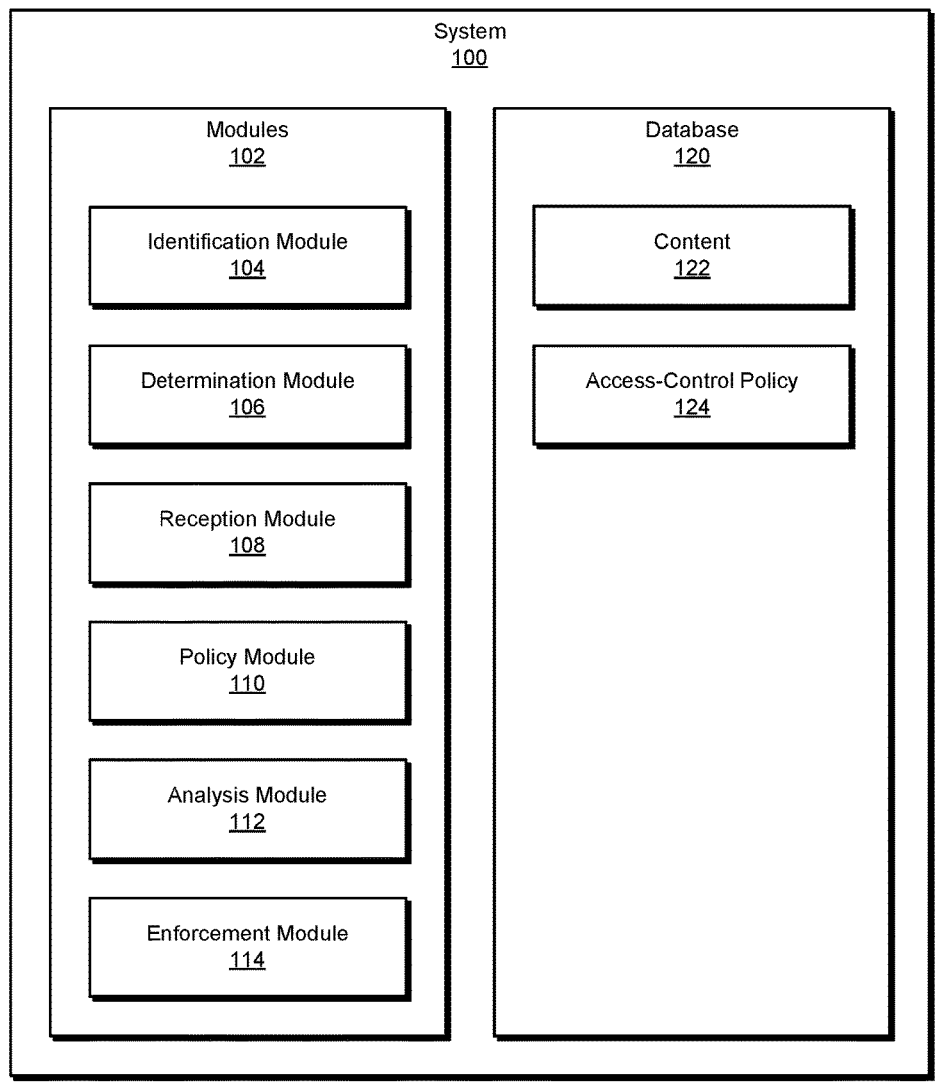
FIG. 1 is a block diagram of a representative system for enforcing access-control policies.

Throughout the drawings, identical reference characters and descriptions indicate similar, but not necessarily identical, elements. While the representative embodiments described herein are susceptible to various modifications and alternative forms, specific embodiments have been shown by way of example in the drawings and will be described in detail herein. However, the representative embodiments described herein are not intended to be limited to the particular forms disclosed. Rather, the instant disclosure covers all modifications, equivalents, and alternatives falling within the scope of the appended claims.

DETAILED DESCRIPTION OF REPRESENTATIVE EMBODIMENTS

The present disclosure is generally directed to systems and methods for enforcing access-control policies. As will be explained in greater detail below, by sampling streaming content, the systems and methods disclosed herein may determine whether the content is restricted for a user. For example, by using a remote device to sample content, the disclosed systems and methods may analyze content on a streaming device to determine the applicability of an access-control policy. The disclosed systems and methods may then enforce the access-control policy for restricted content.

Figure 2:
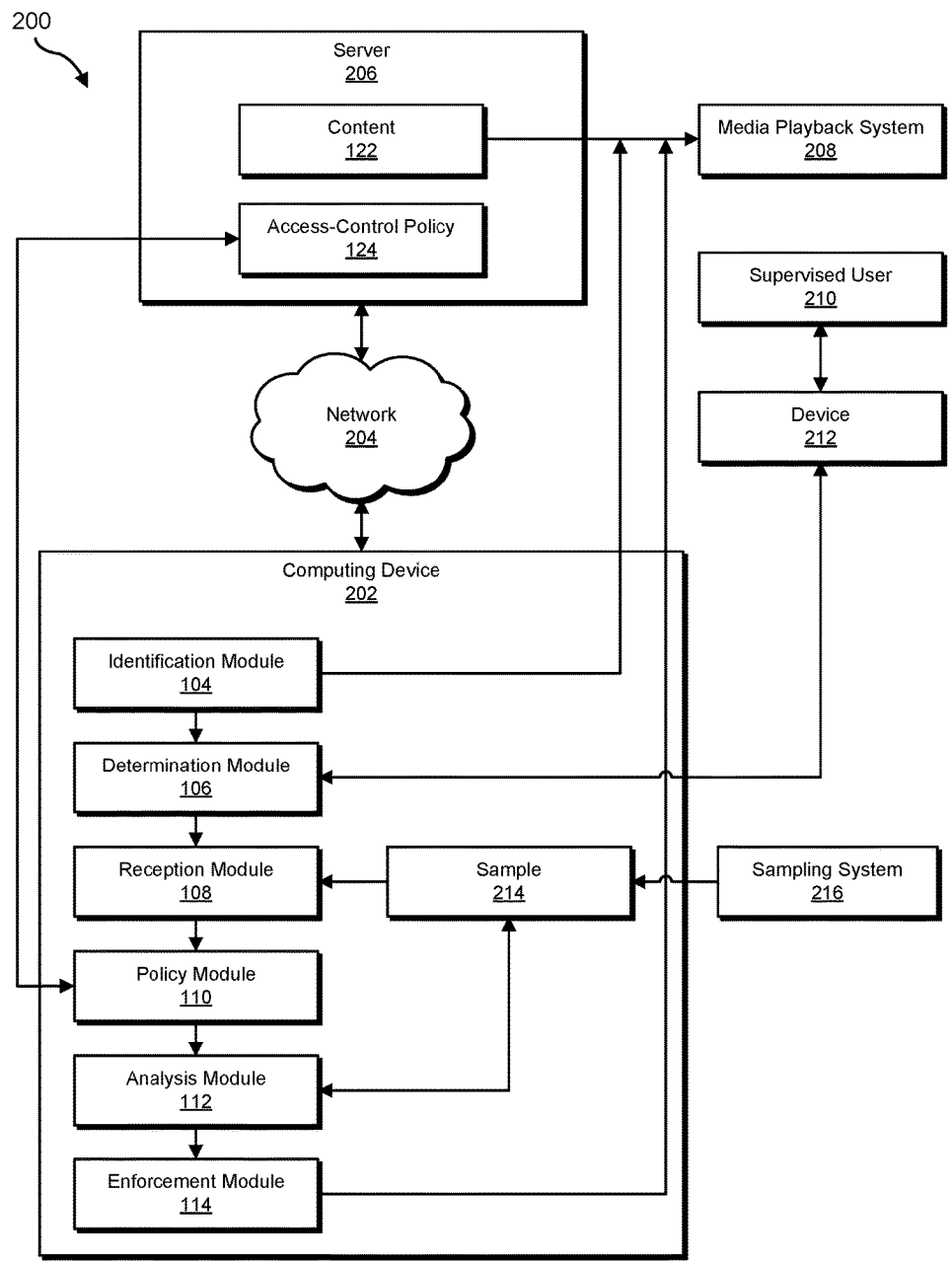
FIG. 2 is a block diagram of an additional representative system for enforcing access-control policies.

The following will provide, with reference to FIGS. 1 and 2, detailed descriptions of representative systems for enforcing access-control policies. Detailed descriptions of a representative gateway device for enforcing access-control policies will be provided in connection with FIG. 3. Detailed descriptions of corresponding computer-implemented methods will also be provided in connection with FIG. 4. In addition, detailed descriptions of a representative content analysis process of a representative sample of content will be provided in connection with FIG. 5. Furthermore, detailed descriptions of a representative computing system and network architecture capable of implementing one or more of the embodiments described herein will be provided in connection with FIGS. 6 and 7, respectively.

FIG. 1 is a block diagram of representative system 100 for enforcing access-control policies. The term "access-control policy," as used herein, generally refers to a rule or set of rules for regulating the amount and/or types of content that a user may access. Access-control policies may include a parental control policy, a security policy, and/or other policies to moderate the use of a computing system and/or software. For example, an access-control policy may allow a parent to restrict a child user from viewing a video with adult content. As another example, an access-control policy may prevent an employee user from accessing a company's server during a specific time of day. As illustrated in FIG. 1, representative system 100 may include one or more modules 102 for performing one or more tasks. For example, and as will be explained in greater detail below, representative system 100 may include an identification module 104 that identifies streaming content that is being transmitted from a media server to a media playback system. As used herein, the phrase "streaming content" generally refers to a process of instant delivery of media from a provider to a user. The term "media playback system," as used herein, generally refers to a computing system, device, and/or service capable of displaying or playing multimedia files.

Representative system 100 may additionally include a determination module 106 that determines that a supervised user is within exposure range of the media playback system and could be exposed to the streaming content. The term "exposure range," as used herein, generally refers to a distance within which a user may be able to hear, view, or otherwise consume content. For example, an exposure range for a user with good vision watching a television screen may be larger than an exposure range for a user with poor vision. As another example, an exposure range for a television may include both the range within which a user may view the screen and the range within which the user may hear the speakers. The exposure range may include a range in which content may be deliberately consumed as well as a range of potential accidental consumption. Representative system 100 may also include a reception module 108 that receives a sample of the content from a sampling system that is remote from the media playback system.

Representative system 100 may further include a policy module 110 that identifies an access-control policy that defines a content-access restriction for the supervised user. Representative system 100 may additionally include an analysis module 112 that determines, based on an analysis of the sample of the content, that the access-control policy applies to the content. Representative system 100 may also include an enforcement module 114 that, in response to determining that the access-control policy applies to the content, enforces the access-control policy by applying the content-access restriction to the streaming content. Although illustrated as separate elements, one or more of modules 102 in FIG. 1 may represent portions of a single module or application or multiple modules or applications.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of representative network architecture 700 in FIG. 7. One or more of modules 102 in FIG. 1 may also represent all or portions of one or more special-purpose computers configured to perform one or more tasks.

As illustrated in FIG. 1, representative system 100 may also include one or more databases, such as database 120. In one example, database 120 may be configured to store streaming content 122, which may include multimedia content for real-time consumption, and/or an access-control policy 124, which may include rules for content restriction.

Database 120 may represent portions of a single database or computing device or a plurality of databases or computing devices. For example, database 120 may represent a portion of server 206 in FIG. 2, computing system 610 in FIG. 6, and/or portions of representative network architecture 700 in FIG. 7. Alternatively, database 120 in FIG. 1 may represent one or more physically separate devices capable of being accessed by a computing device, such as server 206 in FIG. 2, content server 302 and/or policy server 304 in FIG. 3, computing system 610 in FIG. 6, and/or portions of representative network architecture 700 in FIG. 7.

Representative system 100 in FIG. 1 may be implemented in a variety of ways. For example, all or a portion of system 100 may represent portions of system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120. Similarly, both server 206 and computing device 202 may be merged into a single machine or computing system such that the functionality of each of modules 102 is provided within a single device.

In one embodiment, one or more of modules 102 from FIG. 1 may, when executed by at least one processor of computing device 202 and/or server 206, enable computing device 202 and/or server 206 to sample content that may be restricted. For example, and as will be described in greater detail below, identification module 104 may identify streaming content 122 that is being transmitted from a media server, such as server 206, to a media playback system 208. Determination module 106 may determine that a supervised user 210 is within exposure range of media playback system 208 and could be exposed to content 122. Next, reception module 108 may receive a sample 214 of content 122 from a sampling system 216 that is remote from media playback system 208. Policy module 110 may then identify access-control policy 124 that defines a content-access restriction for supervised user 210. Analysis module 112 may determine, based on an analysis of sample 214, that access-control policy 124 applies to content 122. Enforcement module 114 may enforce access-control policy 124 by applying the content-access restriction to content 122.

In the example of FIG. 2, and as will be explained in greater detail below, computing device 202 may first identify content 122 on server 206 streaming to media playback system 208 via network 204. Computing device 202 may then determine that supervised user 210 may be exposed to content 122 streaming to media playback system 208, based on detecting a device 212 belonging to supervised user 210, and receive sample 214 of content 122 from sampling system 216. Next, computing device 202 may identify access-control policy 124 on server 206 for supervised user 210 and analyze sample 214 to determine that access-control policy 124 applies to content 122. Finally, computing device 202 may enforce access-control policy 124 by restricting access by supervised user 210 to content 122.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, representative computing system 610 in FIG. 6, or any other suitable computing device.

Server 206 generally represents any type or form of computing device that is capable of storing media, transmitting media, storing access-control policies, and/or managing access-control policies. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), representative network architecture 700 in FIG. 7, or the like. Network 204 may facilitate communication or data transfer using wireless or wired connections. In one embodiment, network 204 may facilitate communication between computing device 202 and server 206.

Figure 3:
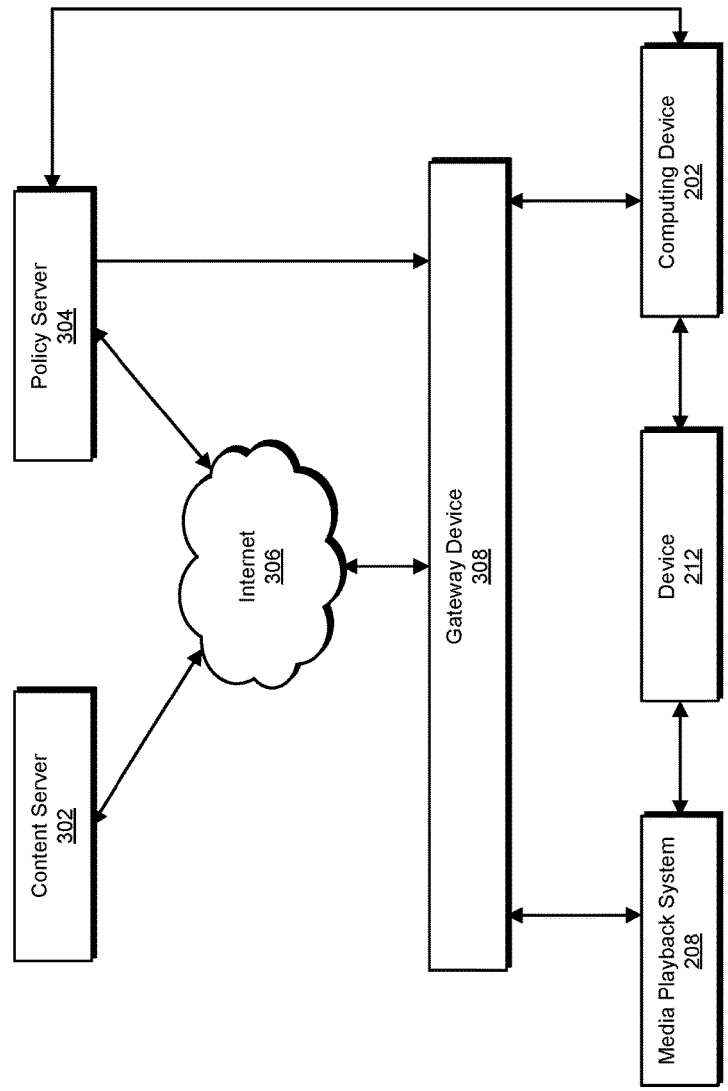
FIG. 3 is a block diagram of a representative gateway device for enforcing access-control policies.

In one example, as shown in FIG. 3, one embodiment of system 200 in FIG. 2 may include a gateway device 308 that may execute one or more of modules 102 in FIG. 1. Computing device 202 may also execute one or more of modules 102 in conjunction with and/or independent from gateway device 308. Server 206 in FIG. 2 may alternately represent a content server 302, which may include content 122, and/or a policy server 304, which may include access-control policy 124. In addition, network 204 in FIG. 2 may represent the Internet 306 in FIG. 3. Computing device 202 may determine device 212 of supervised user 210 in FIG. 2 is within an exposure range of media playback system 208. Gateway device 308 may then mediate content streaming to media playback system 208, and computing device 202 may request gateway device 308 to enforce access-control policy 124 for media playback system 208.

Figure 4:
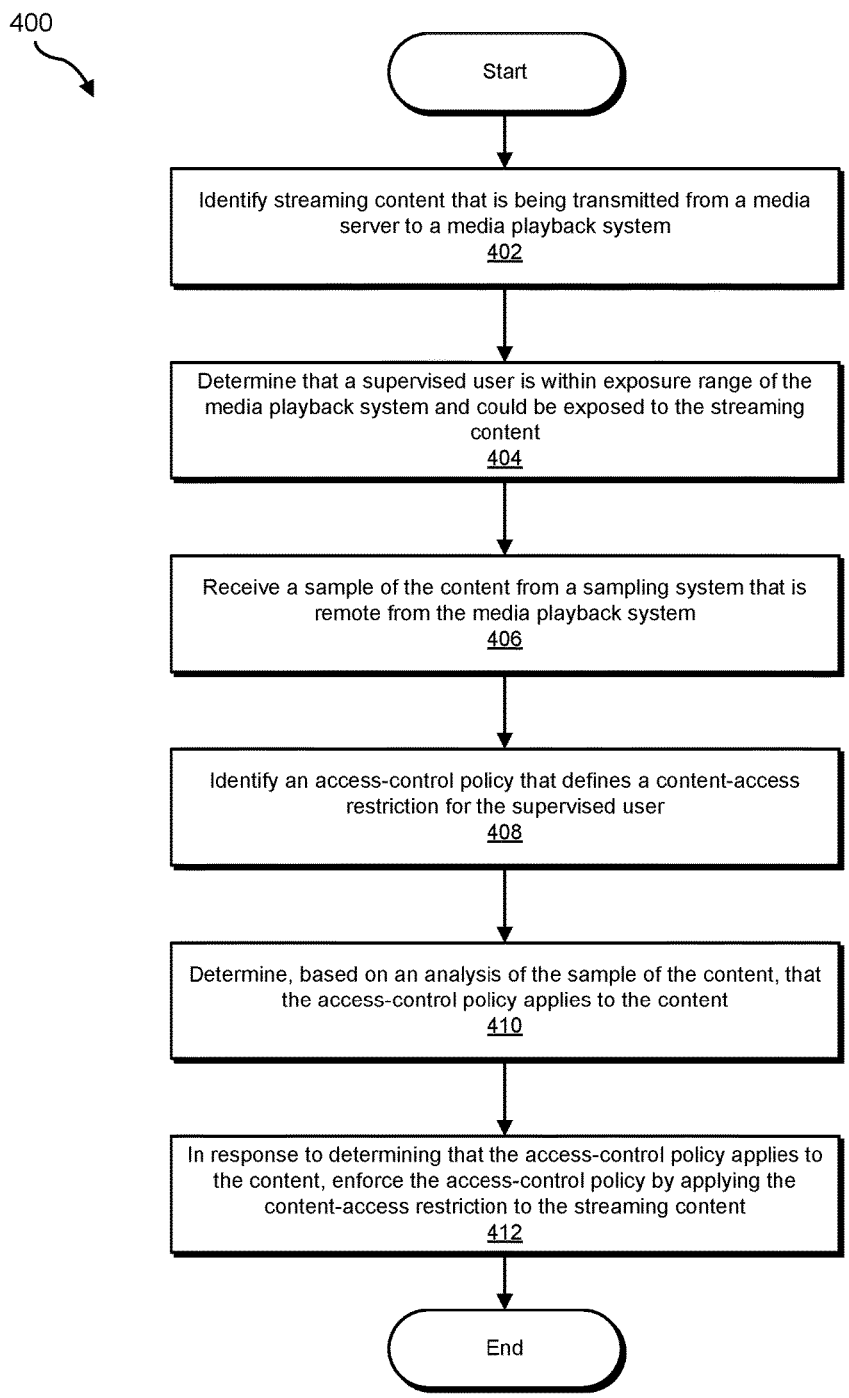
FIG. 4 is a flow diagram of a representative method for enforcing access-control policies.

FIG. 4 is a flow diagram of a representative computer-implemented method 400 for enforcing access-control policies. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, computing system 610 in FIG. 6, and/or portions of representative network architecture 700 in FIG. 7.

As illustrated in FIG. 4, at step 402, one or more of the systems described herein may identify streaming content that is being transmitted from a media server to a media playback system. For example, identification module 104 may, as part of computing device 202 in FIG. 2, identify streaming content 122 that is being transmitted from server 206 to media playback system 208.

Identification module 104 may identify streaming content 122 in a variety of ways. In one embodiment, identification module 104 may monitor traffic on network 204 for streaming content. In the example of FIG. 2, identification module 104 on computing device 202 may connect to and monitor network 204. Identification module 104 may alternatively intercept streaming content from server 206 and/or media playback system 208. For example, identification module 104 may reside on a network device or router that may intercept content streaming from server 206. In other embodiments, identification module 104 may use another device within a network of devices to detect the streaming of content 122. In this example, identification module 104 may detect, such as by using a security camera and/or a microphone of a mobile device connected to network 204, that media playback system 208 is streaming content 122.

In the example of FIG. 3, identification module 104 may reside on gateway device 308 and intercept streaming content from content server 302. In this example, gateway device 308 may intercept all content from a network, such as Internet 306. Gateway device 308 may subsequently identify the content and a destination device, such as media playback system 208. Identification module 104 may also reside on computing device 202 and detect content streaming to media playback system 208 using another device, such as device 212, within the range of media playback system 208.

Returning to FIG. 4, at step 404, one or more of the systems described herein may determine that a supervised user is within exposure range of the media playback system and could be exposed to the streaming content. For example, determination module 106 may, as part of computing device 202 in FIG. 2, determine that supervised user 210 is within exposure range of media playback system 208 and could be exposed to content 122.

Determination module 106 may determine that supervised user 210 is within exposure range of media playback system 208 in a variety of ways. In some examples, determination module 106 may determine that supervised user 210 is within the exposure range of media playback system 208 by identifying supervised user 210 by collecting biometric information. Examples of collecting the biometric information may include, without limitation, facial recognition, voice recognition, scanning a fingerprint, taking an iris scan, and/or any other suitable method of identifying supervised user 210. The biometric information may then be matched to known biometric information to confirm the identity of supervised user 210. Determination module 106 may alternatively receive identifying information of supervised user 210 from a networked device and/or receive login information of supervised user 210 from media playback system 208. Identifying information of supervised user 210 may include biometric information, login information, or other data that may be correlated to supervised user 210. The networked device may include media playback system 208, server 206, device 212 that belongs to supervised user 210, and/or another smart device connected to network 204 that may detect supervised user 210. For example, network 204 may reside in a building with a network of smart devices, and one or more of those devices may attempt to capture identifying information about supervised user 210, such as facial recognition from a camera or voice recognition from a voice command to a device. The identifying information may then be compared, alone or in conjunction with other information, with known information about users who use the building to identify which user profile matches supervised user 210.

Furthermore, determination module 106 may detect device 212 that belongs to supervised user 210 and/or determine that a location of supervised user 210 is within the exposure range. In these examples, determination module 106 may determine that the location of supervised user 210 is within the exposure range by using a motion sensor to detect the location of supervised user 210 and/or determining that a location of device 212 is within the exposure range. For example, determination module 106 may detect a mobile device registered to supervised user 210 and determine that the physical location of the mobile device is within a proximity of media playback system 208 such that supervised user 210 may be within hearing range of content 122 streaming to media playback system 208. Determination module 106 may send a signal to device 212 activating a microphone on device 212. Determination module 106 may then determine that supervised user 210 is within the exposure range based on the microphone of device 212 being within range to detect streaming content 122. In another example, determination module 106 may receive information from a video camera connected to network 204 that identifies supervised user 210 using facial recognition and determines supervised user 210 is within viewing range of video content streaming to media playback system 208.

Returning to FIG. 4, at step 406, one or more of the systems described herein may receive a sample of the content from a sampling system that is remote from the media playback system. For example, reception module 108 may, as part of computing device 202 in FIG. 2, receive sample 214 of content 122 from sampling system 216 that is remote from media playback system 208.

Reception module 108 may receive sample 214 in a variety of ways. As used herein, the term "remote" generally refers to a physically and/or logically separated entity from a target entity. In the example of FIG. 2, sampling system 216 is a physically separate system from media playback system 208 with no direct access to media playback system 208. Furthermore, the term "sample," as used herein, generally refers to an incomplete segment of content that may be representative of the whole of the content. Sample 214 may be of arbitrary size that may depend on the type of content 122 and/or the method used to identify content 122.

In some embodiments, reception module 108 may receive sample 214 from sampling system 216 by determining sampling system 216 is within the exposure range of media playback system 208 by receiving, from sampling system 216, information indicating that sampling system 216 has detected playback of content 122, instructing sampling system 216 to sample content 122, and correlating received sample 214 with content 122. For example, sampling system 216 may be a microphone within range to detect sound from media playback system 208 and send a sample of the sound to reception module 108 via network 204. In other embodiments, sampling system 216 may directly intercept content 122 from server 206 and/or network 204 during transmission to media playback system 208 and send sample 214 to reception module 108. Alternatively, reception module 108 may request sample 214 and/or receive sample 214 from media playback system 208. Furthermore, reception module 108 may receive multiple samples from different devices, such as an audio sample from a microphone and a video sample from a camera, and may combine the multiple samples into a single sample of content 122. In the example of a child streaming a movie, reception module 108 may continue to request sample 214 until dialogue may be heard that identifies sample 214.

In the example of FIG. 3, gateway device 308 may intercept content 122 from content server 302 and sample content 122. Computing device 202 may then receive sample 214 from gateway device 308. Alternatively, computing device 202 may request sample 214 from device 212 belonging to supervised user 210 or another device within the exposure range of media playback system 208.

Returning to FIG. 4, at step 408, one or more of the systems described herein may identify an access-control policy that defines a content-access restriction for the supervised user. For example, policy module 110 may, as part of computing device 202 in FIG. 2, identify access-control policy 124 that defines a content-access restriction for supervised user 210.

Policy module 110 may identify access-control policy 124 in a variety of ways. In one example, policy module 110 may search a database of access-control policies, such as database 120, for policies that apply to supervised user 210. In the example of FIG. 3, policy module 110 may search policy server 304 for policies applying to supervised user 210. Policy server 304 may be a remote server accessed via Internet 306 or a local server on a local network. Additionally or alternatively, policy module 110 may determine, based on the search of the database of access-control policies, that a policy restricts supervised user 210 from accessing at least one type or category of content. In another example, policy module 110 may determine that a different access-control policy stipulates that supervised user 210 is restricted by an amount of content that may be accessed, such as a time limit per day, and/or by an amount of a specific type of content. For example, access-control policy 124 may restrict child users from viewing more than three hours of video per day. Policy module 110 may then determine that supervised user 210 is a child, based on the identification of supervised user 210, and that access-control policy 124 applies to supervised user 210.

Returning to FIG. 4, at step 410, one or more of the systems described herein may determine, based on an analysis of the sample of the content, that the access-control policy applies to the content. For example, analysis module 112 may, as part of computing device 202 in FIG. 2, determine, based on an analysis of sample 214 of content 122, that access-control policy 124 applies to content 122.

Analysis module 112 may determine that access-control policy 124 applies to content 122 in a variety of way. In some embodiments, analysis module 112 may match sample 214 to a known content. In these embodiments, analysis module 112 may use pattern matching or other techniques to match sample 214 to content with a known attribute or category and determine that access-control policy 124 applies to the attribute or category. For example, analysis module 112 may compare sample 214 with a database of known movies and identify a movie that contains dialogue captured in sample 214. Analysis module 112 may then determine that access-control policy 124 applies to the identified movie.

In other embodiments, analysis module 112 may convert sample 214 to textual data and perform a content analysis on the textual data. In these embodiments, analysis module 112 may perform the content analysis on the textual data by text mining the textual data for patterns, categorizing the patterns into at least one content category, and/or determining that access-control policy 124 applies to the content category. The term "text mining," as used herein, generally refers to a data mining process performed on textual data that analyzes patterns in the text. Examples of text mining may include, without limitation, natural language processing (NLP), sentiment analysis, text categorization, predictive classification, or any other suitable method of analysis.

Figure 5:
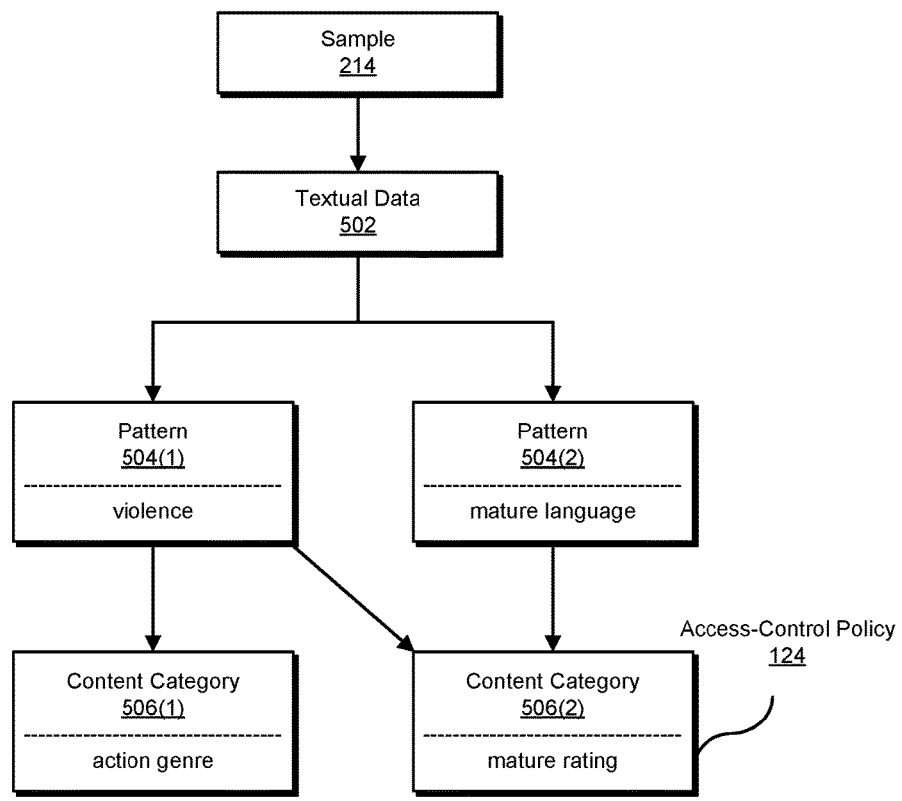
FIG. 5 is a block diagram of a representative content analysis process of a representative sample of content.

For example, as shown in FIG. 5, analysis module 112 may convert sample 214 to textual data 502. In this example, analysis module 112 may detect audio in sample 214 and translate the audio into text. Analysis module 112 may further detect a pattern 504(1) (e.g., "violence") and a pattern 504(2) (e.g., "mature language") based on textual data 502 derived from sample 214. For example, sample 214 may contain a video including explosions and gunshots, and analysis module 112 may subsequently determine that sample 214 contains violence. Analysis module 112 may further categorize pattern 504(1) to a content category 506(1) (e.g., "action genre") and patterns 504(1) and 504(2) to a content category 506(2) (e.g., "mature rating"). Analysis module 112 may then determine that access-control policy 124 restricts supervised user 210 in FIG. 2 from accessing content with a mature rating and that, therefore, access-control policy 124 applies to content 122.

Returning to FIG. 4, at step 412, one or more of the systems described herein may, in response to determining that the access-control policy applies to the content, enforce the access-control policy by applying the content-access restriction to the streaming content. For example, enforcement module 114 may, as part of computing device 202 in FIG. 2, enforce access-control policy 124 by applying the content-access restriction to content 122.

Enforcement module 114 may enforce access-control policy 124 in a variety of ways. In some examples, enforcement module 114 may prevent transmission of content 122 from server 206 to media playback system 208. For example, enforcement module 114 may block all transmissions from server 206 and/or on network 204 after a time limit for supervised user 210 has been reached. In the example of FIG. 3, computing device 202 may identify applicable access-control policy 124 on policy server 304. Policy server 304 may send access-control policy 124 to gateway device 308, which may then block content 122 from content server 302 from transmitting to media playback system 208 based on access-control policy 124. Additionally or alternatively, enforcement module 114 may alert an administrator that supervised user 210 could be exposed to content 122. For example, the administrator may be a parent of a supervised child, and enforcement module 114 may send an alert to a mobile phone of the parent that the supervised child is within viewing range of a mature-rated movie.

As explained above in connection with method 400 in FIG. 4, the disclosed systems and methods may, by sampling streaming content, detect whether an access-control policy applies to a user who may access the streaming content. Specifically, the disclosed systems and methods may first identify a user who is in proximity to a media playback system that is streaming content from a media server. For example, the systems and methods described herein may identify a user, through biometric information, who is streaming a movie from a central router to a television. The disclosed systems and methods may then determine that the user is prohibited from accessing some types of content. Furthermore, the disclosed systems and methods may send requests to devices in close proximity to the media playback system to collect a sample of the streaming content. For example, the systems and methods described herein may use a smart device's microphone to capture an audio sample of the streaming content.

After collecting the sample, the disclosed systems and methods may analyze the sample to determine whether an access-control policy restricts the user from accessing the content. In the example above, the disclosed systems and methods may determine the user is restricted from watching the movie due to mature language found in the audio sample of the content. Alternatively, the disclosed systems and methods may match the sample to a known content and determine that the content violates the access-control policy. In this example, the disclosed systems and methods may match the sample to a specific move and determine the movie rating is inappropriate for the user. The systems and methods described herein may then block the content from streaming or otherwise control the content based on the determination that it violates the access-control policy.

As detailed above, by collecting and analyzing a sample of streaming content from a remote device, the disclosed systems and methods may identify content streaming to a separate device. In addition, by controlling streaming content over a network, the disclosed systems and methods may prevent supervised users from accessing content that violates an access-control policy. Thus, the systems and methods described herein may improve access control for unknown content on streaming devices.

Figure 6:
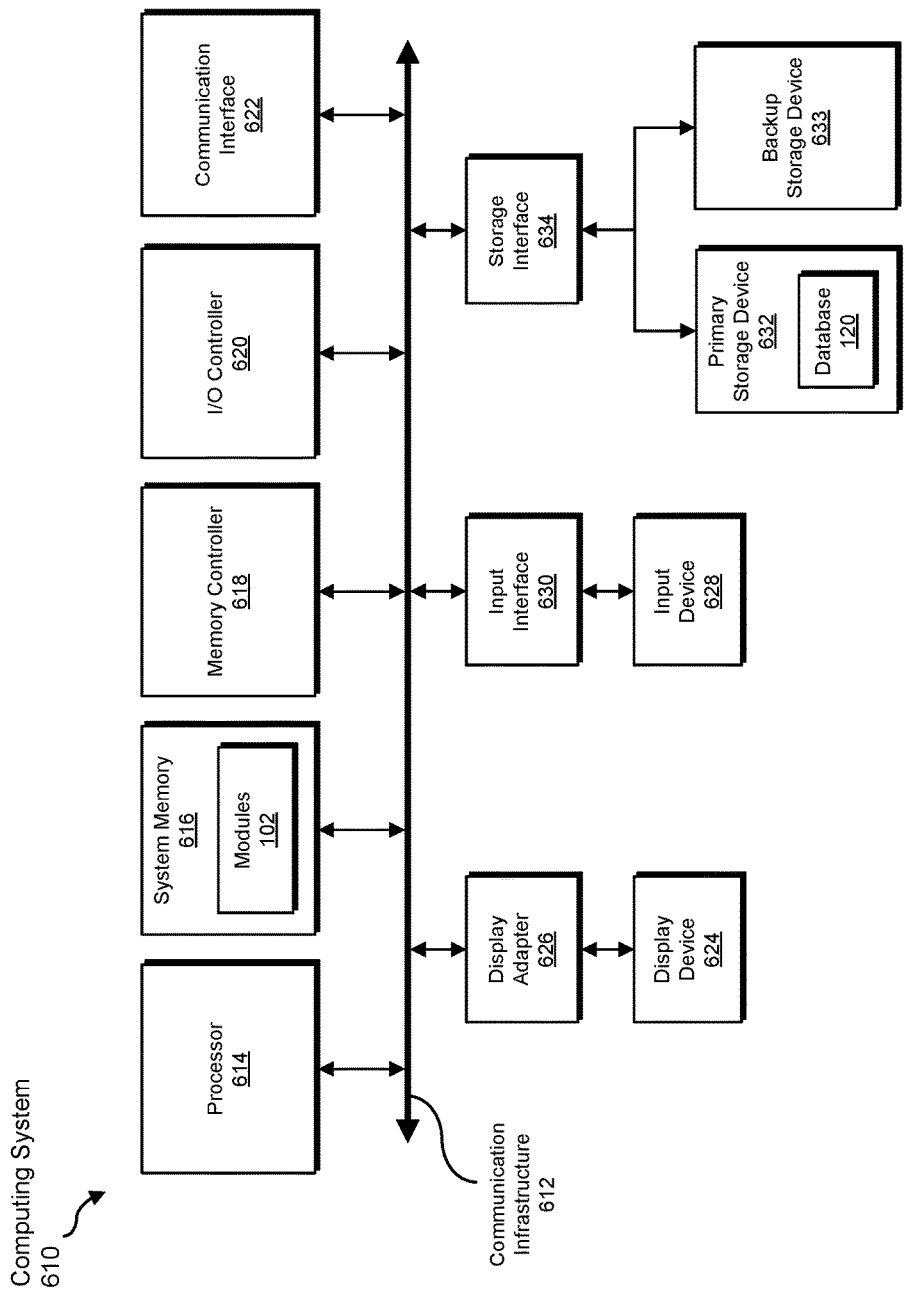
FIG. 6 is a block diagram of a representative computing system capable of implementing one or more of the embodiments described and/or illustrated herein.

FIG. 6 is a block diagram of a representative computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 4). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the representative embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, representative computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between representative computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, representative computing system 610 may also include at least one input device 628 coupled to communication infrastructure 612 via an input interface 630. Input device 628 generally represents any type or form of input device capable of providing input, either computer or human generated, to representative computing system 610. Examples of input device 628 include, without limitation, a keyboard, a pointing device, a speech recognition device, or any other input device.

As illustrated in FIG. 6, representative computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the representative embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions.

Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the representative embodiments described and/or illustrated herein. Additionally or alternatively, one or more of the representative embodiments described and/or illustrated herein may be implemented in firmware and/or hardware. For example, computing system 610 may be configured as an Application Specific Integrated Circuit (ASIC) adapted to implement one or more of the representative embodiments disclosed herein.

Figure 7:
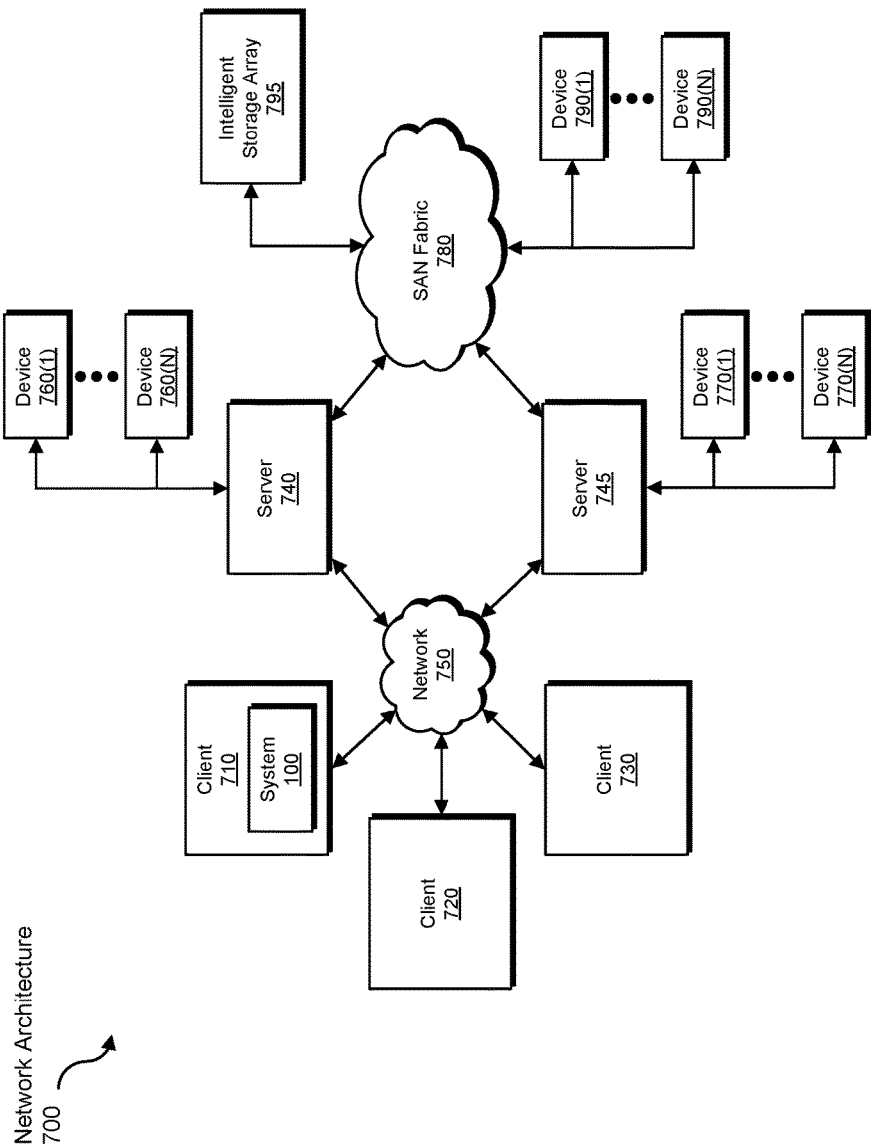
FIG. 7 is a block diagram of a representative computing network capable of implementing one or more of the embodiments described and/or illustrated herein.

FIG. 7 is a block diagram of a representative network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 4). All or a portion of network architecture 700 may also be used to perform and/or be a means for performing other steps and features set forth in the instant disclosure.

Client systems 710, 720, and 730 generally represent any type or form of computing device or system, such as representative computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to representative computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the representative embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the representative embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of a representative method for enforcing access-control policies.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered representative in nature since many other architectures can be implemented to achieve the same functionality.

In some examples, all or a portion of system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of representative system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of representative system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access-control systems, encryption systems, policy compliance systems, intrusion detection and prevention systems, electronic discovery systems, and the like.

According to some examples, all or a portion of system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various representative methods described and/or illustrated herein may also omit one or more of the steps described or illustrated herein or include additional steps in addition to those disclosed.

While various embodiments have been described and/or illustrated herein in the context of fully functional computing systems, one or more of these representative embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the representative embodiments disclosed herein.

In addition, one or more of the modules described herein may transform data, physical devices, and/or representations of physical devices from one form to another. For example, one or more of the modules recited herein may receive a sample of content to be transformed, transform the sample, output a result of the transformation to a storage or output device, use the result of the transformation to determine a content category of the content, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the representative embodiments disclosed herein. This representative description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for enforcing access-control policies, at least a portion of the method being performed by a computing device comprising at least one processor, the method comprising:
   identifying, by the computing device, streaming content that is being transmitted from a media server to a media playback system;
   determining, by the computing device, that a supervised user is within exposure range of the media playback system, and thereby determining that the supervised user is within exposure range of the streaming content;
   receiving, by the computing device, a sample of the content from a sampling system that:
      is within the exposure range of the media playback system;
      is physically separated from the media playback system; and
      samples the content being transmitted from the media server to the media playback system;
   identifying, by the computing device, an access-control policy that defines a content-access restriction for the supervised user;
   determining, based on an analysis of the sample of the content by the computing device, that the access-control policy applies to the content; and
   in response to determining that the access-control policy applies to the content, enforcing the access-control policy by applying the content-access restriction to the streaming content.

2. The method of claim 1, wherein determining that the supervised user is within the exposure range of the media playback system comprises at least one of:
   identifying the supervised user by collecting biometric information;
   receiving identifying information of the supervised user from a networked device;
   receiving login information of the supervised user from the media playback system;
   detecting a device that belongs to the supervised user; and
   determining that a location of the supervised user is within the exposure range.

3. The method of claim 2, wherein determining that the location of the supervised user is within the exposure range comprises at least one of:
   using a motion sensor to detect the location of the supervised user; and
   determining that a location of the device that belongs to the supervised user is within the exposure range.

4. The method of claim 1, wherein receiving the sample of the content from the sampling system comprises:
   determining the sampling system is within the exposure range of the media playback system by receiving, from the sampling system, information indicating that the sampling system has detected playback of the content;
   instructing the sampling system to sample the content; and
   correlating the received sample with the content.

5. The method of claim 1, wherein determining that the access-control policy applies to the content comprises matching the sample of the content to a known content.

6. The method of claim 1, wherein determining that the access-control policy applies to the content comprises:
converting the sample of the content to textual data; and
performing a content analysis on the textual data.

7. The method of claim 6, wherein performing the content analysis on the textual data comprises at least one of:
text mining the textual data for patterns;
categorizing the patterns into at least one content category; and
determining that the access-control policy applies to the content category.

8. The method of claim 1, wherein enforcing the access-control policy comprises at least one of:
preventing transmission of the content from the media server to the media playback system; and
alerting an administrator that the supervised user is within the exposure range of the streaming content.

9. A system for enforcing access-control policies, the system comprising:
at least one memory device that stores one or more computer-readable instructions; and
a computing device comprising at least one hardware processor that executes the one or more computer-readable instructions to:
identify, by a computing device, streaming content that is being transmitted from a media server to a media playback system;
determine, by the computing device, that a supervised user is within exposure range of the media playback system, and thereby determining that the supervised user is within exposure range of the streaming content;
receive, by the computing device, a sample of the content from a sampling system that:
is within the exposure range of the media playback system;
is physically separated from the media playback system; and
samples the content being transmitted from the media server to the media playback system;
identify, by the computing device, an access-control policy that defines a content-access restriction for the supervised user;
determine, based on an analysis of the sample of the content by the computing device, that the access-control policy applies to the content; and
in response to determining that the access-control policy applies to the content, enforce the access-control policy by applying the content-access restriction to the streaming content.

10. The system of claim 9, wherein the hardware processor executes the one or more computer-readable instructions to determine that the supervised user is within the exposure range of the media playback system by at least one of:
identifying the supervised user by collecting biometric information;
receiving identifying information of the supervised user from a networked device;
receiving login information of the supervised user from the media playback system;
detecting a device that belongs to the supervised user; and
determining that a location of the supervised user is within the exposure range.

11. The system of claim 10, wherein determining that the location of the supervised user is within the exposure range comprises at least one of:
using a motion sensor to detect the location of the supervised user; and
determining that a location of the device that belongs to the supervised user is within the exposure range.

12. The system of claim 9, wherein the hardware processor executes the one or more computer-readable instructions to receive the sample of the content from the sampling system by:
determining the sampling system is within the exposure range of the media playback system by receiving, from the sampling system, information indicating that the sampling system has detected playback of the content;
instructing the sampling system to sample the content; and
correlating the received sample with the content.

13. The system of claim 9, wherein the hardware processor executes the one or more computer-readable instructions to determine that the access-control policy applies to the content by matching the sample of the content to a known content.

14. The system of claim 9, wherein the hardware processor executes the one or more computer-readable instructions to determine that the access-control policy applies to the content by:
converting the sample of the content to textual data; and
performing a content analysis on the textual data.

15. The system of claim 14, wherein performing the content analysis on the textual data comprises at least one of:
text mining the textual data for patterns;
categorizing the patterns into at least one content category; and
determining that the access-control policy applies to the content category.

16. The system of claim 9, wherein the hardware processor executes the one or more computer-readable instructions to enforce the access-control policy by at least one of:
preventing transmission of the content from the media server to the media playback system; and
alerting an administrator that the supervised user is within the exposure range of the streaming content.

17. A non-transitory computer-readable medium comprising one or more computer-executable instructions that, when executed by at least one processor of a computing device, cause the computing device to:
identify, by the computing device, streaming content that is being transmitted from a media server to a media playback system;
determine, by the computing device, that a supervised user is within exposure range of the media playback system, and thereby determine that the supervised user is within exposure range of the streaming content;
receive, by the computing device, a sample of the content from a sampling system that:
is within the exposure range of the media playback system;
is physically separated from the media playback system; and
samples the content being transmitted from the media server to the media playback system;
identify, by the computing device, an access-control policy that defines a content-access restriction for the supervised user;

determine, based on an analysis of the sample of the content by the computing device, that the access-control policy applies to the content; and in response to determining that the access-control policy applies to the content, enforce the access-control policy by applying the content-access restriction to the streaming content.

18. The non-transitory computer-readable medium of claim 17, wherein the computer-executable instructions cause the computing device to determine that the supervised user is within the exposure range of the media playback system by at least one of:

identifying the supervised user by collecting biometric information;

receiving identifying information of the supervised user from a networked device;

receiving login information of the supervised user from the media playback system;

detecting a device that belongs to the supervised user; and determining that a location of the supervised user is within the exposure range.

19. The non-transitory computer-readable medium of claim 18, wherein determining that the location of the supervised user is within the exposure range comprises at least one of:

using a motion sensor to detect the location of the supervised user; and determining that a location of the device that belongs to the supervised user is within the exposure range.

20. The non-transitory computer-readable medium of claim 17, wherein the computer-executable instructions cause the computing device to receive the sample of the content from the sampling system by:

determining the sampling system is within the exposure range of the media playback system by receiving, from the sampling system, information indicating that the sampling system has detected playback of the content;

instructing the sampling system to sample the content; and correlating the received sample with the content.

* * * * *